(12) United States Patent
Royer, Jr. et al.

(10) Patent No.: US 8,612,666 B2
(45) Date of Patent: Dec. 17, 2013

(54) METHOD AND SYSTEM FOR MANAGING A NAND FLASH MEMORY BY PAGING SEGMENTS OF A LOGICAL TO PHYSICAL ADDRESS MAP TO A NON-VOLATILE MEMORY

(75) Inventors: Robert J. Royer, Jr., Portland, OR (US); Robert Faber, Hillsboro, OR (US); Brent Chartrand, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 12/495,573

(22) Filed: Jun. 30, 2009

(65) Prior Publication Data

US 2010/0332730 A1    Dec. 30, 2010

(51) Int. Cl.
*G06F 12/00* (2006.01)
*G06F 12/10* (2006.01)

(52) U.S. Cl.
USPC ............................ 711/103; 711/202; 711/206

(58) Field of Classification Search
USPC .......................................... 711/103, 202, 206
See application file for complete search history.

(56) References Cited

U.S. PATENT DOCUMENTS

| | | | |
|---|---|---|---|
| 6,704,852 B2 * | 3/2004 | Lai et al. ........................ | 711/206 |
| 7,356,641 B2 * | 4/2008 | Venkiteswaran ............. | 711/103 |
| 7,895,410 B1 * | 2/2011 | Wu ................................ | 711/203 |
| 8,010,770 B2 * | 8/2011 | Wu et al. ........................ | 711/207 |
| 2004/0088474 A1 * | 5/2004 | Lin ................................ | 711/103 |
| 2007/0005928 A1 | 1/2007 | Trika et al. | |
| 2007/0094445 A1 | 4/2007 | Trika et al. | |
| 2007/0168698 A1 * | 7/2007 | Coulson et al. ................... | 714/5 |
| 2008/0301397 A1 * | 12/2008 | Goh et al. ...................... | 711/202 |
| 2009/0083478 A1 * | 3/2009 | Kunimatsu et al. ........... | 711/103 |
| 2009/0113121 A1 * | 4/2009 | Lee et al. ...................... | 711/103 |
| 2009/0164702 A1 * | 6/2009 | Kern ............................. | 711/103 |
| 2009/0327582 A1 * | 12/2009 | Chartrand ..................... | 711/103 |

* cited by examiner

*Primary Examiner* — Sanjiv Shah
*Assistant Examiner* — Glenn Gossage
(74) *Attorney, Agent, or Firm* — Konrad Raynes Davda & Victor LLP; David W. Victor

(57) ABSTRACT

A method and system to facilitate paging of one or more segments of a logical-to-physical (LTP) address mapping structure, such as a table, to a non-volatile memory, such as a NAND flash memory. The LTP address mapping structure is part of an indirection system map associated with the non-volatile memory. By allowing one or more segments of the LTP address mapping structure to be paged to the non-volatile memory, the amount of volatile memory required to store the LTP address mapping structure is reduced while maintaining the benefits of the LTP address mapping structure. One or more segments of the logical to physical address mapping structure may be cached in volatile memory, and a size of each segment may be the same as or a multiple of a page size of the NAND flash memory. A lookup or segment table may be provided to indicate a location of each segment and may be optimized for sequential physical addresses.

21 Claims, 7 Drawing Sheets

```
Procedure LTP_Lookup (Logical Page L, Segment Size S)
{
  Segment = L/S
  SegmentTableEntry = SegmentTable[Segment]
  If (SegmentTableEntry.InDram == TRUE)
  {
    Offset = L%S
    L2PTableSegment = SegmentTableEntry.DRAMAddress
    Return (L2PTableSegment[Offset])
  }
  Else /*SegmentTableEntry is NAND */
  {
    Identify NAND address of paged out segment
    SegmentTable[Segment]
    Identify DRAM Segment table buffer to load the requested
    Segment Table data into. (Note: This may require a write to NAND of
    the data currently in the buffer in the case of a dirty DRAM segment.
    Issue NAND read of the identified NAND address
    Return (L2PTableSegment on NAND)
  }
}
```

```
Procedure LTP_Lookup (Logical Page L, Segment Size S)
{
  Segment = L/S
  SegmentTableEntry = SegmentTable[Segment]
  If (SegmentTableEntry.InDram == TRUE)
  {
    Offset = L%S
    L2PTableSegment = SegmentTableEntry.DRAMAddress
    Return (L2PTableSegment[Offset])
  }
  Elseif (SegmentTableEntry.Defragged ==TRUE)
  {
    Offset = L % S
    Addr = L2PTableDegment.StartingPhysicalNANDAddr
    Address = Addr + Offset
  }
  Else /*SegmentTableEntry is NAND */
  {
    Identify NAND address of paged out segment
    SegmentTable[Segment]
    Identify DRAM Segment table buffer to load the requested
    Segment Table data into. (Note: This may require a write to NAND of
    the data currently in the buffer in the case of a dirty DRAM segment.
    Issue NAND read of the identified NAND address
    Return (L2PTableSegment on NAND)
  }
}
```

| 411 Ptr. To DRAM LTP segment | 412 Physical page addr. of NAND | 414 Ptr. To DRAM LTP segment | 415 Physical page addr. of NAND | 416 Ptr. To DRAM LTP segment |
|---|---|---|---|---|

| 710 Physical page addr. of the first LTP table entry in this segment |
|---|

METHOD AND SYSTEM FOR MANAGING A NAND FLASH MEMORY BY PAGING SEGMENTS OF A LOGICAL TO PHYSICAL ADDRESS MAP TO A NON-VOLATILE MEMORY

FIELD OF THE INVENTION

This invention relates to memory management, and more specifically but not exclusively, to improve the management policies of a NAND flash memory.

BACKGROUND DESCRIPTION

The use of non-volatile media such as NAND flash memories in computer platforms has been increasing. A large and flat logical indirection system map such as a logical-to-physical address mapping table can be used for the management of NAND flash memories in solid state drives (SSDs) and caches. The logical-to-physical address mapping table requires a fixed capacity ratio of a volatile memory to a NAND flash memory. For example, in a platform that assigns four kilobytes of the NAND flash memory per page, the volatile memory stores a logical-to-physical address mapping table and a four byte entry in the table is required for every four kilobytes of NAND flash memory, i.e., approximately one megabyte of volatile memory is required for every one gigabyte of NAND flash memory.

The requirement for the fixed capacity ratio of the volatile memory to the NAND flash memory may be inadequate for platforms bounded by the capacity of the volatile memory, cost of the volatile memory, perception of the need of volatile memory to support management of NAND flash memory, performance and/or product branding constraints.

BRIEF DESCRIPTION OF THE DRAWINGS

The features and advantages of embodiments of the invention will become apparent from the following detailed description of the subject matter in which:

FIG. 6 illustrates a pseudo code of the operations to look up an entry of a logical-to-physical address mapping table in accordance with one embodiment of the invention;

FIG. 7 illustrates an optimized lookup table in accordance with one embodiment of the invention;

FIG. 8 illustrates another example of pseudo code of the operations to look up an entry of a logical-to-physical address mapping table in accordance with one embodiment of the invention.

DETAILED DESCRIPTION

Figure 1:
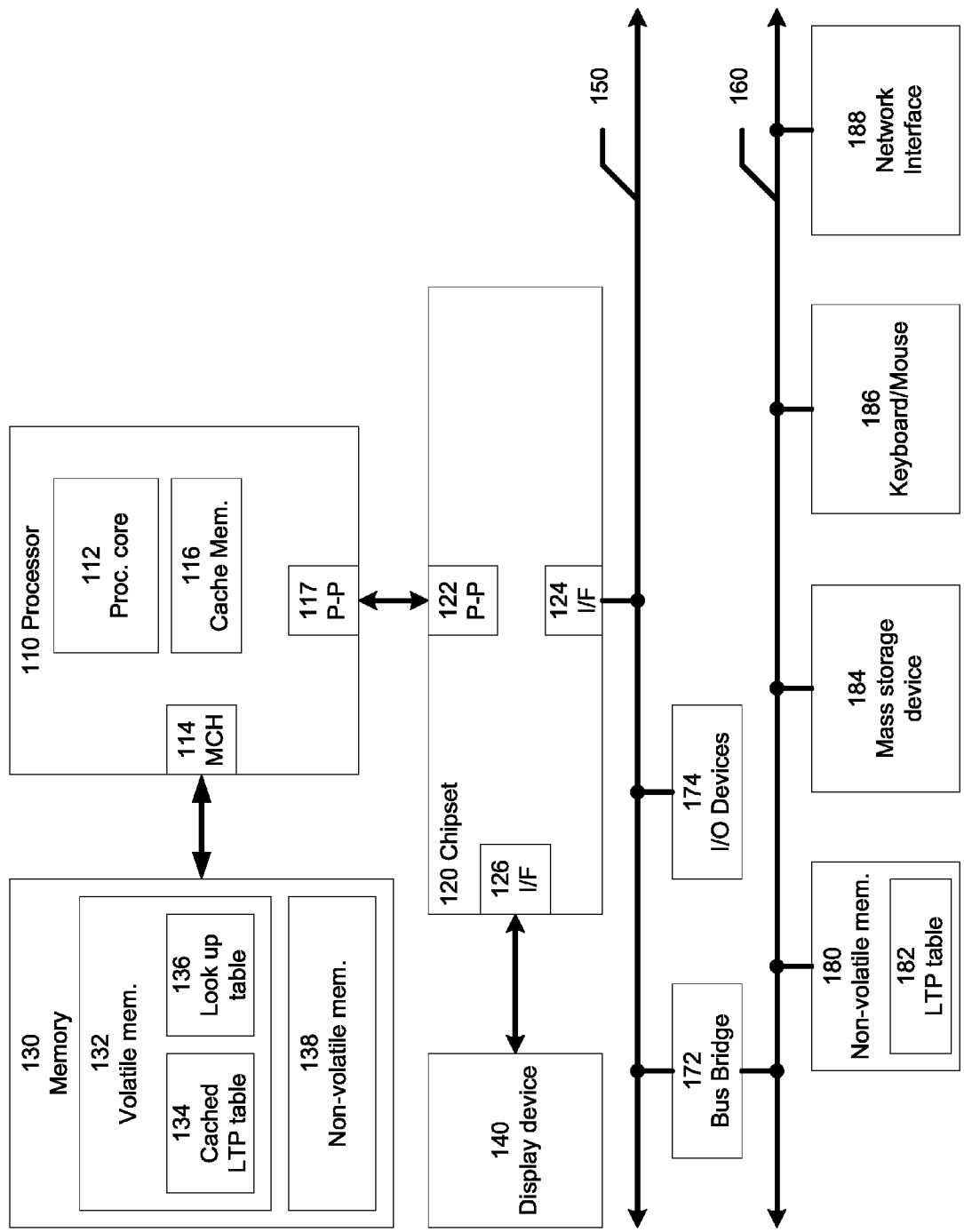
FIG. 1 illustrates a system to implement the methods disclosed herein in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention are directed to a method and system to facilitate paging of one or more segments of a logical-to-physical (LTP) address mapping structure to a non-volatile memory. The LTP address mapping structure is part of an indirection system map associated with the non-volatile memory in one embodiment of the invention. By allowing one or more segments of the LTP address mapping structure to be paged to the non-volatile memory, the amount of volatile memory required to store the LTP address mapping structure is reduced while maintaining the benefits of the LTP address mapping structure in one embodiment of the invention.

In one embodiment of the invention, only some sections or segments of the LTP address mapping structure are located or cached in the volatile memory during the operations of a system. The rest of the segments are stored in the non-volatile memory until the segments are required. In one embodiment of the invention, the LTP address mapping structure includes, but is not limited to, a table, an array, or any other mapping structure to map a logical address to a physical address.

FIG. 1 illustrates a system 100 to implement the methods disclosed herein in accordance with one embodiment of the invention. The system 100 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 100 used to implement the methods disclosed herein may be a system on a chip (SOC) system.

The processor 110 has a processing core 112 to execute instructions of the system 100. The processing core 112 includes, but is not limited to, pre-fetch logic to fetch instructions, decode logic to decode the instructions, execution logic to execute instructions and the like. The processor 110 has a cache memory 116 to cache instructions and/or data of the system 100. In another embodiment of the invention, the cache memory 116 includes, but is not limited to, level one, level two and level three, cache memory or any other configuration of the cache memory within the processor 110.

The memory control hub (MCH) 114 performs functions that enable the processor 110 to access and communicate with a memory 130 that includes a volatile memory 132 and/or a non-volatile memory 138. The volatile memory 132 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 138 includes, but is not limited to, NAND flash memory, phase change memory (PCM), read only memory (ROM), electrically erasable programmable read only memory (EEPROM), or any other type of non-volatile memory device.

The memory 130 stores information and instructions to be executed by the processor 110. The memory 130 may also stores temporary variables or other intermediate information while the processor 110 is executing instructions. In one embodiment of the invention, the volatile memory 132 has a cached LTP address mapping table 134 and a lookup table 136. In one embodiment of the invention, the entire LTP address mapping table 182 associated with the non-volatile memory 180 is stored in the non-volatile memory 180 and the volatile memory 132 caches one or more segments of the LTP address mapping table 182 in the cached LTP address mapping table 134.

In another embodiment of the invention, the volatile memory 132 caches only some segments of the LTP address mapping table associated with the non-volatile memory 180 in the cached LTP address mapping table 134. The rest of the segments of the LTP address mapping table not cached in the cached LTP address mapping table 134 are stored in the LTP address mapping table 182 in the non-volatile memory 180. In one embodiment of the invention, the lookup table 136 indicates a location of each segment of the LTP address mapping table associated with the non-volatile memory 180.

The chipset 120 connects with the processor 110 via Point-to-Point (PtP or P-P) interfaces 117 and 122. The chipset 120 enables the processor 110 to connect to other modules in the system 100. In one embodiment of the invention, the interfaces 117 and 122 operate in accordance with a PtP communication protocol such as the Intel® QuickPath Interconnect (QPI) or the like. (QUICKPATH is a trademark registered to Intel Corporation in the United States and other countries.) The chipset 120 connects to a display device 140 that includes, but is not limited to, liquid crystal display (LCD), cathode ray tube (CRT) display, or any other form of visual display device.

In addition, the chipset 120 connects to one or more buses 150 and 160 that interconnect the various modules 174, 180, 184, 186, and 188. Buses 150 and 160 may be interconnected together via a bus bridge 172 if there is a mismatch in bus speed or communication protocol. The chipset 120 couples with a non-volatile memory 180, a mass storage device(s) 184, a keyboard/mouse 186 and a network interface 188. The mass storage device 184 includes, but is not limited to, a solid state drive, a hard disk drive, a universal serial bus (USB) flash memory drive, or any other form of computer data storage medium. The network interface 188 is implemented using any type of well known network interface standard including, but not limited to, an Ethernet interface, a universal serial bus (USB) interface, a Peripheral Component Interconnect (PCI) Express (PCIe) interface, a wireless interface and/or any other suitable type of interface. The wireless interface operates in accordance with, but is not limited to, the Institute of Electrical and Electronics Engineers (IEEE) wireless standard family 802.11, Home Plug AV (HPAV), Ultra Wide Band (UWB), Bluetooth, WiMax, or any form of wireless communication protocol.

While the modules shown in FIG. 1 are depicted as separate blocks within the system 100, the functions performed by some of these blocks may be integrated within a single semiconductor circuit or may be implemented using two or more separate integrated circuits. For example, although the cache memory 116 is depicted as a separate block within the processor 110, the cache memory 116 can be incorporated into the processor core 112 respectively. The system 100 may include more than one processor/processing core in another embodiment of the invention. In another embodiment of the invention, the non-volatile memory 138 may perform a similar function as the non-volatile memory 180 and has a similar LTP address mapping table. In addition, there are other functional blocks or more instances of each block that can be connected in system 100 that are not shown.

Figure 2:
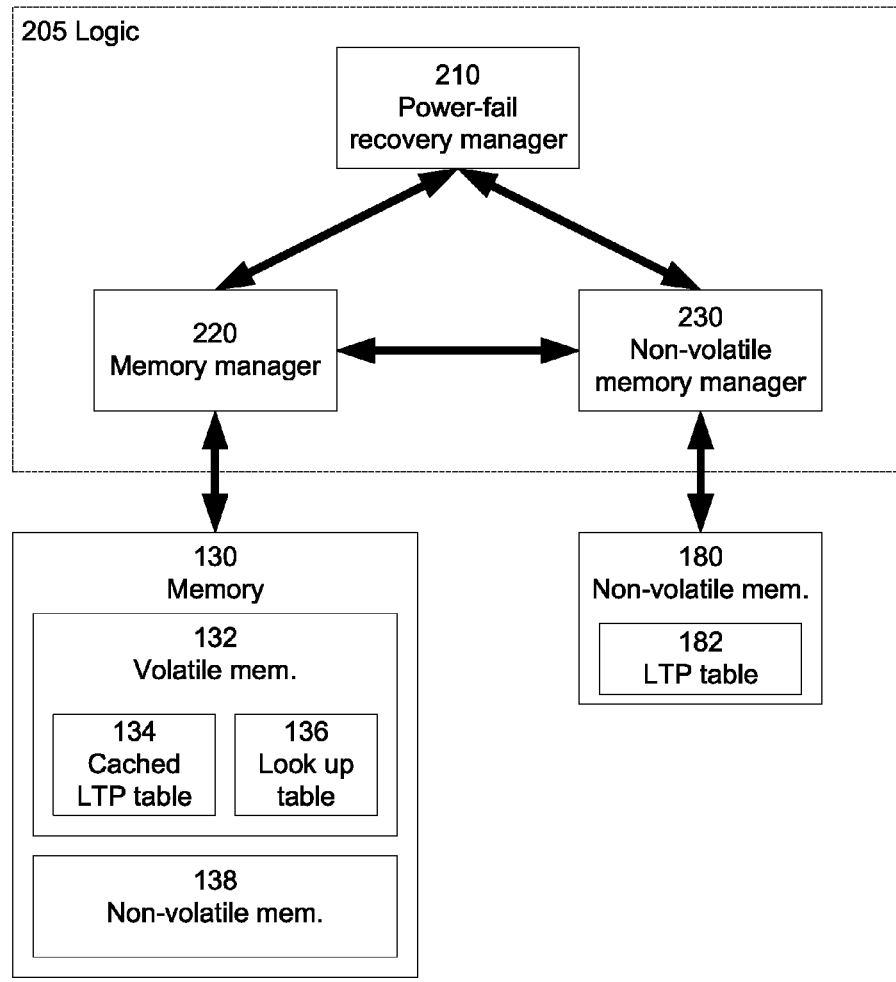
FIG. 2 illustrates the modules in a system to implement the methods disclosed herein in accordance with one embodiment of the invention.

FIG. 2 illustrates the modules 200 in a system 100 (FIG. 1) to implement the methods disclosed herein in accordance with one embodiment of the invention. The modules 200 include, but are not limited to, the logic block 205, the memory 130, and the non-volatile memory 180. The logic block 205 has three modules that include the power-fail recovery manager 210, the memory manager 220 and the non-volatile memory manager 230. The memory manager couples with the memory 130 and it manages the amount of memory in the volatile memory 132 that can be allocated for the cached LTP address mapping table 134.

In one embodiment of the invention, when the system 100 is initialized, the memory manager 220 divides a portion of the available memory space in the volatile memory 132 into a number of buffers. In one embodiment of the invention, the allocation of the available memory space is fixed. In another embodiment of the invention, the memory manager 220 has the ability to add or delete buffers dynamically during the operation of the system 100. In one embodiment of the invention, if the system 100 supports paging of the non-volatile memory 180, the size of each buffer is set as the page size of the non-volatile memory 180. Each buffer or frame in the volatile memory 132 can hold or store a segment of the LTP address mapping table 182 in the non-volatile memory 180. The memory manager 220 has the ability to add and/or remove cached segments of the LTP address mapping table 182 as needed from the cached LTP address mapping table 134. The memory manager 220 also tracks dirty cached segments of the cached LTP address mapping table 134, i.e., cached segments that have been updated in the cached LTP address mapping table 134 but have not been saved to the LTP address mapping table 182, and manages the flushing of these dirty cached segments to the LTP address mapping table 182.

In one embodiment of the invention, the lookup table 136 (which may also be termed a segment table) allows the memory manager 220 to determine where each segment of the LTP address mapping table associated with the non-volatile memory 180 is located, i.e., determine if a particular segment is cached in the cached LTP address mapping table 134 in the volatile memory 132 or stored in the LTP address mapping table 182 in the non-volatile memory 180. When the memory manager 220 receives a request to access an entry or a logical address of the LTP address mapping table, it determines to which particular segment of the LTP address mapping table the logical address belongs. After the particular segment is determined, the memory manager 220 checks the location of the particular segment from the lookup table 136.

In one embodiment, if the lookup table 136 indicates that the particular segment of the LTP address mapping table is not cached in the cached LTP address mapping table 134, i.e., the particular segment is in the LTP address mapping table 182 in the non-volatile memory 180, the memory manager 220 determines if any of the buffers in the volatile memory 132 are unused or available. If there is an unused buffer, the memory manager 220 caches the particular segment from the LTP address mapping table 182 in the non-volatile memory 180 into the unused buffer in the volatile memory 132. If there is no unused buffer, memory manager 220 selects one or more cached segments in the cached LTP address mapping table 134 to be evicted to the non-volatile memory 180 based on a caching policy and evicts the selected one or more segments in the cached LTP address mapping table 134 to the non-volatile memory 180.

After evicting the selected one or more segments, the memory manager 220 caches the particular segment from the LTP address mapping table 182 into the evicted one or more segments in the cached LTP address mapping table 134. In one embodiment of the invention, the memory manager 220 has the ability to pin or lock one or more cached segments in the cached LTP address mapping table 134 to prevent the pinned segment(s) from paging to the non-volatile memory 180. This allows critical Logical Block Addresses (LBAs) to be pinned in the volatile memory 130 and it eliminates the potential extra non-volatile memory 180 accesses if the segment containing the LBAs is not in the cached LTP address mapping table 134. The performance of the system 100 and the lifespan of the non-volatile memory 180 can be enhanced when the memory manager 220 supports the pinning of one or more cached segments in the cached LTP address mapping table 134.

The non-volatile memory manager 230 is coupled to the non-volatile memory 180 and is responsible for reading from and writing to a segment(s) of the LTP address mapping table 182. In one embodiment of the invention, the non-volatile memory manager 230 accesses the non-volatile memory 180 via paging. In another embodiment of the invention, the non-volatile memory manager 230 accesses the non-volatile memory 180 via individual memory line access. One of ordinary skill in the relevant art will readily appreciate that other methods of accessing the non-volatile memory 180 can also be used without affecting the workings of the invention.

In one embodiment of the invention, when the non-volatile memory manager 230 receives a read request of a particular segment in the LTP address mapping table 182, it checks the page address of the particular segment specified in the read request and retrieves the particular segment accordingly. In one embodiment of the invention, the page address of the particular segment is obtained from the lookup table 136 by the memory manager 220 and the memory manager 220 sends the read request with the page address of the particular segment to the non-volatile memory manager 230.

The management of a write request of a particular segment in the non-volatile memory 180 is dependent on the type of memory in the non-volatile memory 180. For example, in one embodiment of the invention, the non-volatile memory 180 is a NAND flash memory. Although a NAND flash memory can be read or programmed one byte at a time, erasing the contents of the NAND flash memory is performed by erasing an erase block at a time. When the non-volatile memory manager 230 receives a write request of a particular segment in the LTP address mapping table 182, it checks for an erase block in the non-volatile memory 180 that does not have any user data and writes the particular segment to the erase block.

By writing segment(s) of the LTP address mapping table 182 to an erase block with no user data, it avoids a potential deadlock condition in one embodiment of the invention. For example, a deadlock condition can arise when a relocation, i.e., moving all valid data out of an erase block and erasing the erase block, is needed before a particular segment can be paged out of the cached LTP address mapping table 134 to the non-volatile memory 180. The relocation may require a segment of the cached LTP address mapping table 134 to be paged in but all the segments of the cached LTP address mapping table 134 are currently dirty.

In the event of insufficient erased capacity in the non-volatile memory 180, the non-volatile memory manager 230 enables the relocation process to select an erase block that only contain segments of the LTP address mapping table 182 and not user data. This is because erase blocks that contains user data may potentially require additional paging in of cached segments of the LTP address mapping table 134. This policy allows the non-volatile memory manager 230 to make forward progress until sufficient erased space exists to resume normal relocation policies. One of ordinary skill in the relevant art will readily appreciate that other types of write management techniques can be applied for other types of non-volatile memory and these write management techniques can be applied without affecting the workings of the invention.

The power-fail recovery manager 210 is coupled with the memory manager 220 and the non-volatile memory manager 230. In the event of a power failure to the system 100, the power-fail recovery manager 210 ensures that the data integrity of the LTP address mapping table associated with the non-volatile memory 180 is maintained. In one embodiment of the invention, the power-fail recovery manager 210 recovers the LTP address mapping table associated with the non-volatile memory 180 after a power fail or crash event to the system 100.

Figure 9:
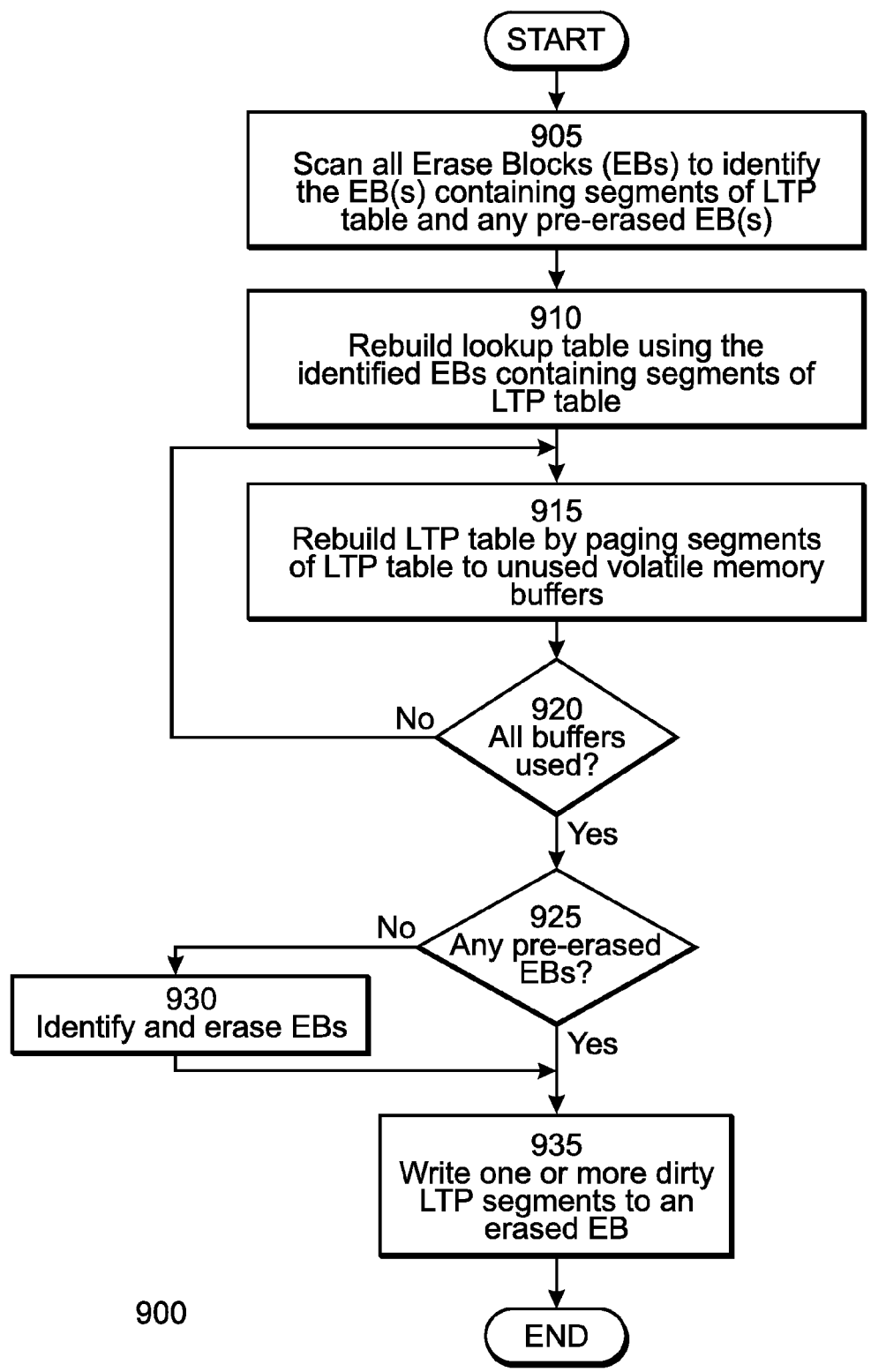
FIG. 9 illustrates a flowchart of the operations to recover a logical-to-physical address mapping table in accordance with one embodiment of the invention.

In one embodiment of the invention, when the volatile memory 132 has sufficient capacity to store the entire LTP address mapping table, the power-fail recovery manager 210 temporarily allocates buffers in the volatile memory 132 to rebuild the LTP address mapping table. After the LTP address mapping table is rebuilt, the entire LTP address mapping table is paged to the non-volatile memory 180 and the allocated buffers are freed. In another embodiment of the invention, when the volatile memory 132 has insufficient capacity to store the entire LTP address mapping table, the process described in the flowchart 900 of FIG. 9 is used.

Although the memory manager 220, non-volatile memory manager 230 and the power-fail recovery manager 210 are illustrated and described as separate logic blocks, it is not meant to be limiting. In another embodiment of the invention, the memory manger 220, non-volatile memory manager 230 and the power-fail recovery manager 210 are integrated into one logic block. In yet another embodiment, the memory manger 220 is integrated with the memory 130. Similarly, the non-volatile memory manager 230 can be integrated with the non-volatile memory 180 in another embodiment of the invention. The memory manger 220, non-volatile memory manager 230 and the power-fail recovery manager 210 can be implemented as hardware, firmware, software, or any combination thereof. In one embodiment of the invention, the memory manger 220, non-volatile memory manager 230 and the power-fail recovery manager 210 are implemented as a block storage driver in an operating system executing on the system 100. One of ordinary skill in the relevant will readily appreciate that other variations in the placement or location of the memory manger 220, non-volatile memory manager 230 and the power-fail recovery manager 210 can be used without affecting the workings of the invention.

Figure 3:
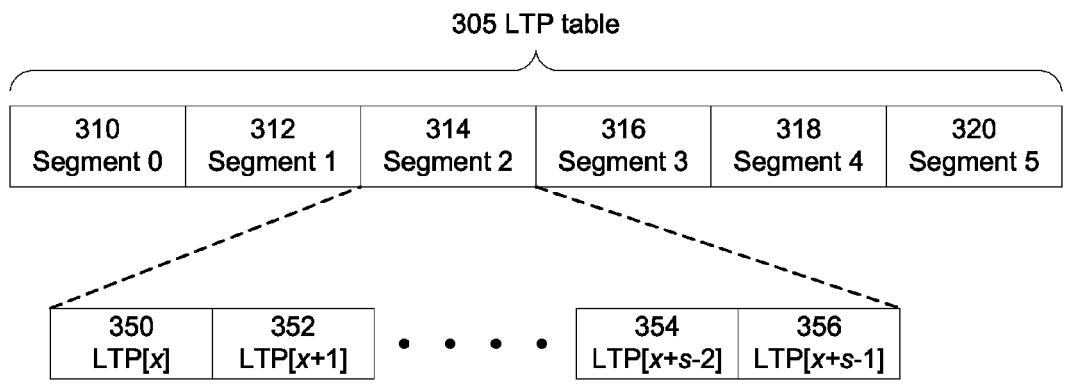
FIG. 3 illustrates an arrangement of a logical-to-physical address mapping table in accordance with one embodiment of the invention.

FIG. 3 illustrates an arrangement 300 of a LTP address mapping table 305 in accordance with one embodiment of the invention. The LTP address mapping table 305 allows the system 100 to determine the physical page address of any given logical page address of the non-volatile memory 180. In one embodiment of the invention, LTP address mapping table 305 is divided into a number of segments or sections. This allows one or more parts or portions of the LTP address mapping table 305 to be cached in a different storage area. For example, in one embodiment of the invention, the LTP address mapping table 305 is divided into six segments 310, 312, 314, 316, 318, and 320. Although the segments 310, 312, 314, 316, 318, and 320 are illustrated in sequential sequence, the storage of each segment may be not be stored in contiguous parts of the non-volatile memory 180. For example, if the non-volatile memory 180 is a NAND flash memory, segment 0 310 and segment 1 312 may be stored in one erase block and segments 314, 316, 318, and 320 may be stored in another erase block.

Each segment of the LTP address mapping table 305 has one or more LTP entries and each LTP entry represents a particular mapping of a logical address to a physical address of the non-volatile memory 180. In one embodiment of the invention, the number of LTP entries per segment is set to the ratio of the page size in bytes of the non-volatile memory 180 to the size of each LTP entry in bytes. This allows each segment of the LTP address mapping table 305 to be saved or stored into a single page of the non-volatile memory 180. For example, if the size of each page of the non-volatile memory 180 is 8 kilobytes (kb) and the size of each LTP entry is 4 bytes, the number of LTP entries per segment is (8×1024 bytes)/4 bytes=2048. An LTP address mapping table of N entries and S LTP entries per segment is divided into NIS segments. Segment 2 314 is illustrated in an expanded view and LTP[x] 350 and LTP[x+1] 352 depict the first and second LTP entries of segment 2 314 respectively. Segment 2 314 has s entries and LTP[x+s−2] 354 and LTP[x+s−1] 356 depict the penultimate and ultimate entries of segment 2 314 respectively.

By setting the size of each segment of the LTP address mapping table 305 to a page size of the non-volatile memory 180, it allows simple and efficient implementation in the system 100. In another embodiment of the invention, the size of each segment of the LTP address mapping table 305 is set to a multiple of a page size of the non-volatile memory 180. For example, in one embodiment of the invention, the size of each segment can be set as the size of three pages of the non-volatile memory 180. In another embodiment of the invention, the segments of the LTP address mapping table 305 have unequal sizes. One of ordinary skill in the relevant art will readily appreciate that other variations of the size of each segment of the LTP address mapping table 305 can be utilized without affecting the workings of the invention.

Figure 4:
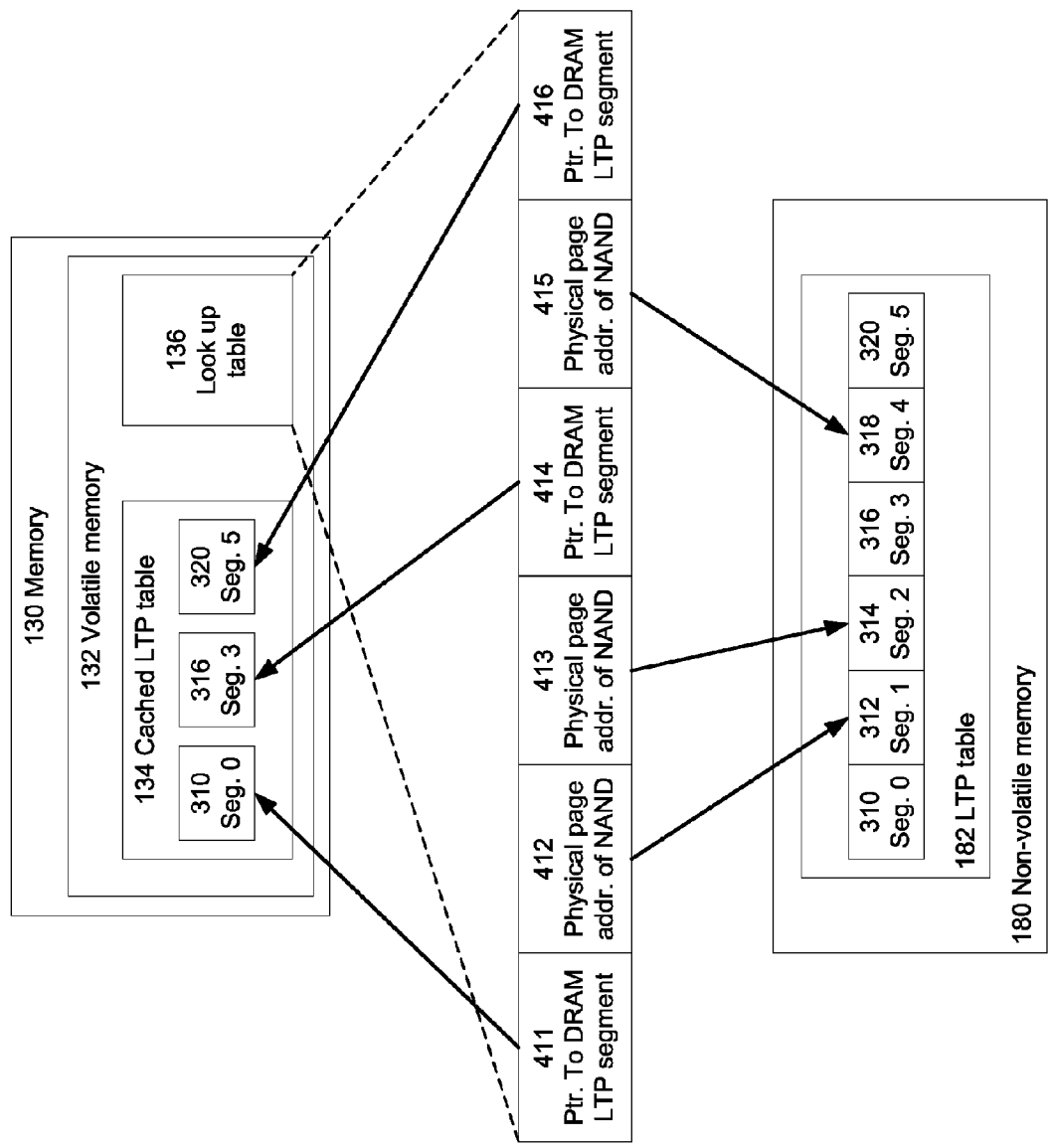
FIG. 4 illustrates an arrangement of a lookup table in accordance with one embodiment of the invention.

FIG. 4 illustrates an arrangement 400 of a lookup table 136 in accordance with one embodiment of the invention. In the example of FIG. 4, the entire LTP address mapping table associated with the non-volatile memory 180 is stored in LTP address mapping table 182. In another embodiment of the invention, LTP address mapping table 182 stores only the segments of the LTP address mapping table that are not cached in the cached LTP address mapping table 134.

After the LTP address mapping table 182 is divided into segments, the memory manager 220 can cache some segments of the LTP address mapping table 182 into the cached LTP address mapping table 134 in one embodiment of the invention. To monitor or keep track of each segment, a lookup table 136 or segment table allows the system 100 to determine if the LTP information that it requires resides in the non-volatile memory 180 or in the memory 130 and determine the location of the LTP information on the appropriate media.

By facilitating the caching of one or more segments of the LTP address mapping table 182 in the cached LTP addressing mapping table 134, the memory manager 220 allows a volatile memory 130 of a smaller capacity than LTP address mapping table 182 to be utilized while enabling the LTP addressing scheme. For example, if the volatile memory 130 has a capacity of 1 megabytes and the LTP address mapping table 182 requires 2 megabytes of memory space, the memory manager 220 is able to cache only some portions of the LTP address mapping table 182 in the volatile memory 130 and stores the remaining portions of the LTP address mapping table 182 in the non-volatile memory 180 in one embodiment of the invention.

For the purposes of illustration, the memory 130 and the non-volatile memory 180 are assumed to be DRAM and NAND flash memory respectively. The memory manager 220 is assumed to cache segment 0 310, segment 3 316 and segment 5 320 of the LTP address mapping table 182 in the cached LTP address mapping table 134. The memory manager 220 creates and maintains a lookup table 136 that allows it to keep track of the location of each segment of the LTP address mapping table. The i-th entry of the lookup table 136 specifies whether the i-th segment is in the memory 130 or in the non-volatile flash memory 180.

In one embodiment of the invention, the memory manager 220 stores a pointer to each segment of the LTP address mapping table 182 cached in the cached LTP address mapping table 134. Pointers 411, 414 and 416 in lookup table 136 are directed to segment 0 310, segment 3 316 and segment 5 320 respectively. For example, in one embodiment of the invention, when the memory manager 220 receives a request to access an entry in segment 0 of the LTP address mapping table 182, it checks or reads the first entry of the lookup table 136 to obtain a pointer to segment 0 in the cached LTP address mapping table 134.

In one embodiment of the invention, the memory manager 220 stores a physical page address of each segment of the LTP address mapping table 182 not cached in the cached LTP address mapping table 134. Physical page addresses 412, 413 and 415 in lookup table 136 are directed to segment 1 312, segment 2 314 and segment 4 318 respectively. For example, in one embodiment of the invention, when the memory manager 220 receives a request to access an entry in segment 4 of the LTP address mapping table 182, it checks or reads the fifth entry of the lookup table 136 to obtain a physical page address of segment 4 in the LTP address mapping table 182.

Although the lookup table 136 uses pointers and physical page addresses to indicate or specify the location of each segment of the LTP address mapping table, it is not meant to be limiting. One of ordinary skill in the relevant art will readily appreciate that other techniques or methods of indicating the location of each segment of the LTP address mapping table can be used without affecting the workings or the scope of the invention.

Figure 5A:
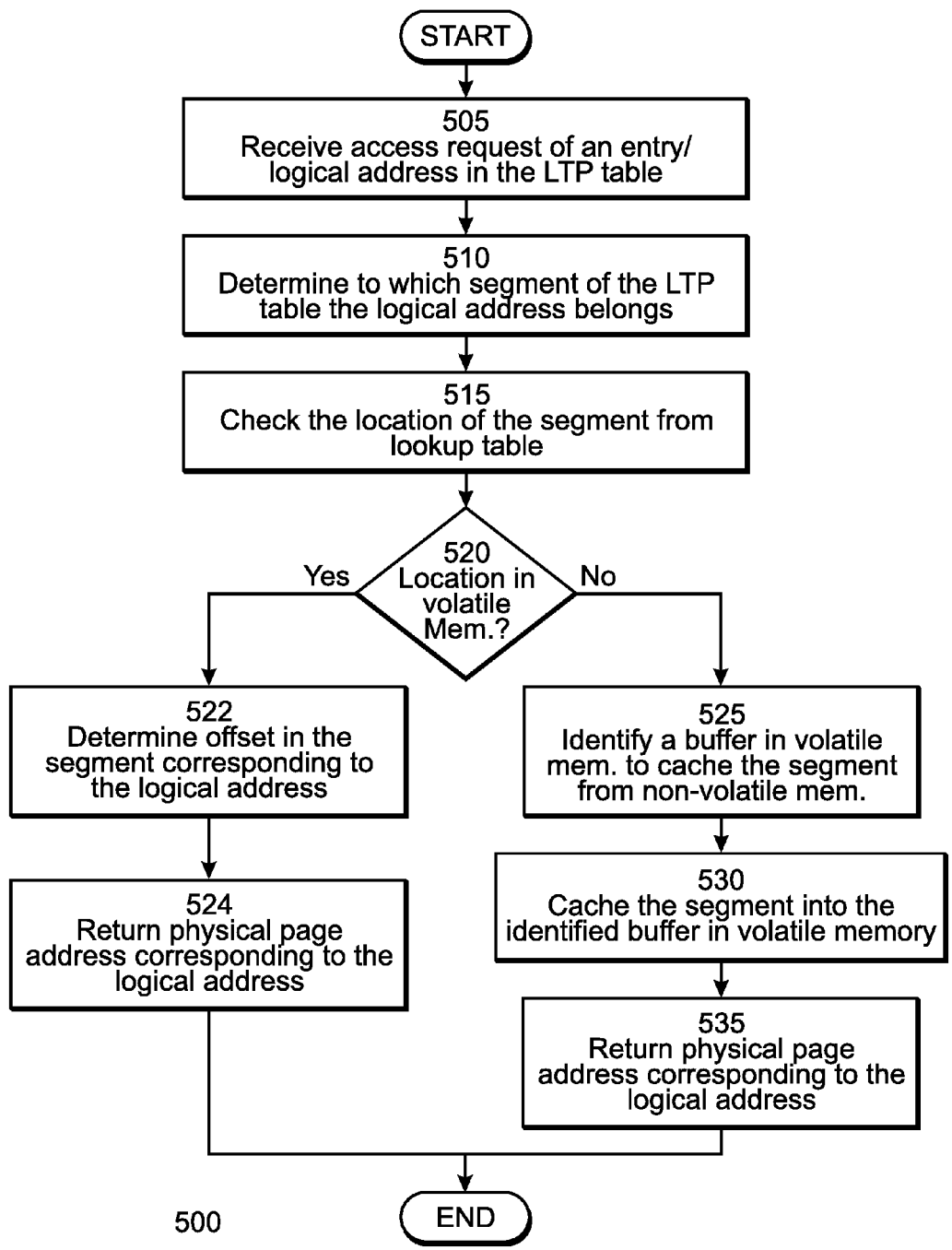
FIG. 5A illustrates a flowchart of the operations to look up an entry of a logical-to-physical address mapping table in accordance with one embodiment of the invention.

FIG. 5A illustrates a flowchart 500 of the operations to look up an entry of an LTP address mapping table. In step 505, the memory manager 220 receives an access request of an entry or a logical address of the LTP address mapping table associated with non-volatile memory 180. In step 510, the memory manager 220 determines to which segment of the LTP address mapping table the logical address belongs. In one embodiment of the invention, the memory manager 220 uses the ratio of the logical address to be accessed to the number of entries per segment of the LTP address mapping table to determine which segment of the LTP address mapping table where the logical address belongs. For example, in one embodiment of the invention, if the number of entries per segment of the LTP address mapping table is 2048 and the logical address of the access request is 9044, the memory manager 220 performs an integer division of the ratio of 9044/2048 to obtain 4, i.e., the logical address of 9044 belongs to the fourth segment of the LTP address mapping table.

In step 515, the memory manager 220 checks the location of the segment determined in step 510 from the lookup table. In step 520, the memory manager 220 checks if the lookup table 136 indicates that the location of the segment is in the cached LTP address mapping table 134 in the volatile memory 132. If yes, the memory manager 220 determines the offset in the segment corresponding to the logical address of the access request in step 522. In step 524, the memory manager 220 returns the physical page address corresponding to the logical address of the access request and the flowchart 500 ends.

If in step 520, the lookup table 136 does not indicate that the location of the segment is in the cached LTP address mapping table 134 in the volatile memory 132, i.e., the segment is in the LTP address mapping table 182 in the non-volatile memory 180, the memory manager 220 identifies a buffer in the volatile memory 132 to cache the segment from the non-volatile memory 180 in step 525. In step 530, the memory manager 220 sends a read request of the segment to the non-volatile memory manager 230 and caches the segment from the LTP address mapping table 182 in the non-volatile memory 180 into the volatile memory 132. The memory manager 220 returns the physical page address corresponding to the logical address of the access request in step 535 and the flowchart 500 ends. One of ordinary skill in the relevant art will readily appreciate that some of the steps in the flowcart 500 may also be arranged in a different sequence or may be executed in parallel.

Figure 5B:
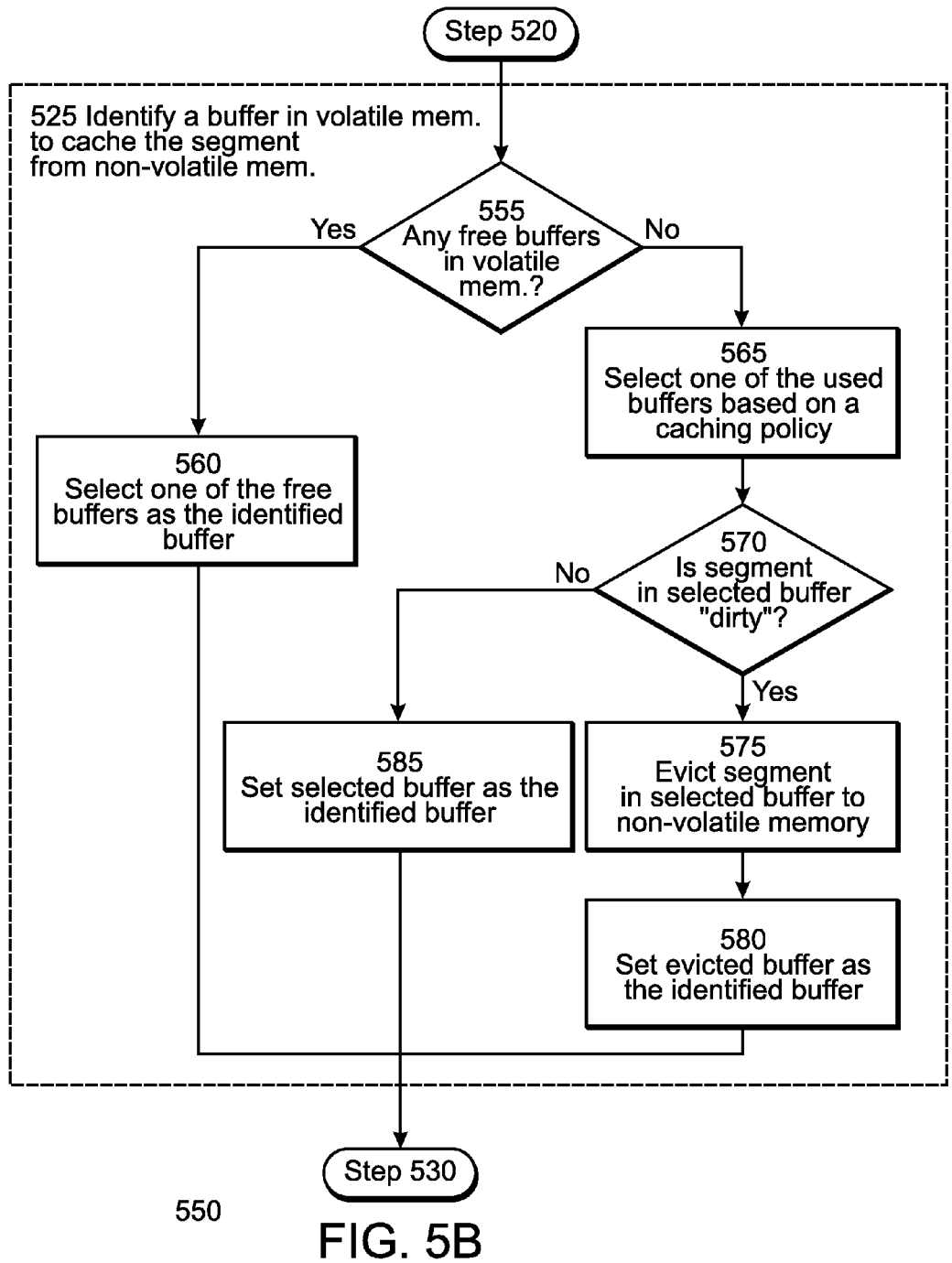
FIG. 5B illustrates a flowchart of the operations to Identify a buffer in a volatile memory to cache a segment of a logical-to-physical address mapping table from a non-volatile memory in accordance with one embodiment of the invention.

FIG. 5B illustrates a detailed flowchart 550 of the operations in step 525 of FIG. 5A to identify a buffer in a volatile memory to cache a segment of an LTP address mapping table from a non-volatile memory in accordance with one embodiment of the invention. In step 555, the memory manager 220 checks if there are any free buffers in the volatile memory 132. If yes, the memory manager 220 selects one of the free buffers as the identified buffer in step 560 and the flow goes to step 530. In one embodiment of the invention, the selection of the free buffers is based on a policy that includes but is not limited to, a least recently used policy, and the like. If no in step 555, the memory manager 220 selects one of the used buffers in the volatile memory 132 based on a caching policy in step 565. The caching policy includes, but is not limited to, a least recently used (LRU) policy, a first in first out (FIFO) policy, and the like.

In step 570, the memory manager 220 checks if the segment in the selected buffer is dirty. If no, the memory manager 220 sets the selected buffer as the identified buffer in step 585 and the flow goes to step 530. If yes in step 570, the memory manager 220 evicts the segment in the selected buffer to the LTP address mapping table 182 in the non-volatile memory 180. In step 580, the memory manager 220 sets the evicted buffer as the identified buffer and the flow goes to step 530.

FIG. 6 illustrates a pseudo code 600 of the operations to look up an entry of an LTP address mapping table in accordance with one embodiment of the invention. One of ordinary skill in the relevant art will appreciate the workings of the pseudo code 600 and therefore the pseudo code 600 shall not be described in detail herein.

FIG. 7 illustrates an optimized lookup table 700 in accordance with one embodiment of the invention. In one embodiment of the invention, an optimization to the LTP address mapping table associated with a non-volatile memory 180 can be made when the LTP entries in a particular segment are pointing to sequential physical addresses. In such a scenario, the entry for the particular segment in the lookup table 700 can store or specify the physical address corresponding to the first logical page in that particular segment and marks the particular segment as optimized. For example, in a segment having S logical pages, if the logical pages 0 to 5-1 in the segment are mapped to physical address pages X to X+S−1, the memory manager 220 marks the entry in the lookup table as optimized and stores the physical page address X in the entry. This is illustrated as element 710 of the lookup table 700. This optimization effectively compresses the LTP address mapping table in the non-volatile memory 180, and eliminates the need to access the non-volatile memory 180 to retrieve the entries of the segment. For example, when the memory manger 220 receives an access request of a logical address in segment 2 of the LTP address mapping table, it checks the lookup table 700 and obtains a physical page address. As the entry 710 is optimized, the memory manager 220 can easily determine the physical page address corresponding to the logical address by adding the offset of the logical address in segment 2 with the obtained physical page address.

In one embodiment of the invention, the system 100 performs defragmentation to allow the optimization to occur more frequently. Files such as video files, audio files, and the like, typically have relatively large sizes and are written sequentially and physically contiguous on the non-volatile memory 180. These large files can benefit from the optimization of the LTP address mapping table.

FIG. 8 illustrates another example of pseudo code 800 of the operations to look up an entry of an LTP address mapping table in accordance with one embodiment of the invention. The pseudo code 800 includes additional code that is highlighted in bold font to lookup an optimized lookup table 700. One of ordinary skill in the relevant art will readily appreciate the workings of the pseudo code 800 and therefore the pseudo code 800 shall not be described in detail herein.

FIG. 9 illustrates a flowchart 900 of the operations to recover a LTP address mapping system in accordance with one embodiment of the invention. Flowchart 900 illustrates a scenario when there is insufficient volatile memory 132 to rebuild the LTP address mapping table associated with a NAND flash memory. In step 905, the power-fail recovery manager 210 scans all erase blocks (EBs) of the NAND flash memory to identify the EB(s) containing segments of the LTP address mapping table and any pre-erased EB(s). In step 910, the power-fail recovery manager 210 rebuilds the lookup table using the identified EBs containing segments of the LTP address mapping table.

In step 915, the power-fail recovery manager 210 rebuilds the LTP address mapping table by paging segments of the LTP address mapping table to unused buffers in the volatile memory. In step 920, the power-fail recovery manager 210 checks if all the buffers in the volatile memory are used. If no, the flowchart 900 goes back to step 915. If yes, the flow goes to step 925 and the power-fail recovery manager 210 checks if there are any pre-erased EBs in the NAND flash memory. If no, the power-fail recovery manager 210 identifies and erases EBs in the NAND flash memory in step 930 and the flow goes to step 935. If yes, the power-fail recovery manager 210 writes one or more dirty segments of the LTP address mapping table to an erased EB in step 935 and the flow ends.

Although the methods and techniques disclosed herein are with reference to an LTP address mapping structure, it is not meant to be limiting. In another embodiment of the invention, the methods and techniques disclosed herein may be also be applied to other data structures such as an erase block (EB) state array and the like, without affecting the workings of the invention. One of ordinary skill in the relevant art will readily appreciate how to adapt the methods and techniques disclosed herein to other data structures and these data structures are within the scope of this invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it should be apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is adapted to operate for its desired functionality when the device or system is in an off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus coupled with a processor, comprising:
a NAND flash memory comprising a first memory;
a logical-to-physical (LTP) address mapping structure associated with the NAND flash memory, wherein the LTP address mapping structure includes a plurality of LTP entries each providing a logical address to a physical address mapping, wherein the LTP address mapping structure is divided into a plurality of segments;
a second memory storing information and instructions to be executed by the processor, wherein the second memory is operable to cache less than all the segments of the LTP address mapping structure;
a lookup table having a pointer for each segment of the LTP address mapping structure cached in the second memory and a physical address of each segment of the LTP address mapping structure in the first memory not cached in the second memory; and
logic coupled with the NAND flash memory to:
use the lookup table to control read and write to segments of the LTP address mapping structure in the NAND flash memory and to add and remove segments of the LTP address mapping structure in the second memory;
determine that one of the segments of the LTP address mapping structure not cached in the second memory comprises contiguous physical addresses for all entries in the determined segment not cached in the second memory, and
store in the lookup table a physical address corresponding to a first entry of a logical address of the determined one of the segments.

2. The apparatus of claim 1, wherein a size of each segment of the LTP address mapping structure is a page size of the NAND flash memory or a multiple of the page size.

3. The apparatus of claim 1, wherein the logic to control read and write to segments of the LTP address mapping structure is to further:
receive a request to write at least one of the segments to the NAND flash memory;
determine that an erase block of the NAND flash memory is available in response to receiving the request; and
write the at least one of the segments to the determined erase block.

4. The apparatus of claim 1, wherein the logic comprises a block storage driver.

5. The system of claim 1, wherein the logic further indicates the determined one of the segments as optimized.

6. A system including a processor comprising:
a NAND flash memory, comprising a first memory, to store a plurality of sections of an indirection system map of the NAND flash memory;
a second memory storing information and instructions executed by the processor, wherein the second memory is operable to cache less than all the sections of the indirection system map;
a lookup table indicating whether sections of the indirection system map are cached in the second memory or are stored in the NAND flash memory and indicating locations of the sections of the indirection system map in the second memory and the sections of the indirection system map in the NAND flash memory that are not cached in the second memory; and
logic to:
control caching of one or more of the plurality of sections of the indirection system map in the second memory;
determine that one of the sections of the indirection system map not cached in the second memory comprises contiguous physical addresses for all entries in the determined one of the sections not cached in the second memory, and
store in the lookup table a physical address corresponding to a first entry of a logical address of the determined one of the sections.

7. The system of claim 6, wherein the indirection system map comprises a logical-to-physical address mapping structure of the NAND flash memory.

8. The system of claim 6, wherein the logic further indicates the determined one of the sections as optimized.

9. The system of claim 6, wherein the logic is further to pin at least one of the cached one or more sections of the indirection system map in the second memory, wherein the pinned section is prevented from paging to the NAND flash memory.

10. The system of claim 6, wherein the second memory is one of Synchronous Dynamic Random Access Memory (SDRAM), Dynamic Random Access Memory (DRAM), RAMBUS DRAM (RDRAM) and Double Data Rate three (DDR3) SDRAM.

11. The system of claim 6, wherein a size of each section of the indirection system map is a page size of the NAND flash memory or a multiple of the page size.

12. The system of claim 11, wherein the logic is to:
store a pointer in the lookup table to each section of the indirection system map cached in the second memory; and
store a physical page address in the lookup table of each section of the indirection system map not cached in the second memory.

13. The system of claim 6, wherein the logic is further to divide an unused portion of the second memory into a plurality of buffers, and to control caching of the one or more sections of the indirection system map into the plurality of buffers.

14. The system of claim 13, wherein the logic is further to:
determine that the lookup table is to indicate that a section of the indirection system map to be accessed is not cached in the second memory;
determine whether at least one of the buffers in the second memory is unused;
cache the section of the indirection system map to be accessed from the NAND flash memory into the at least one unused buffer in the second memory in response to determining that there is at least one unused buffer in the second memory;
select one or more sections of the indirection system map cached in one or more of the buffers to be evicted to the NAND flash memory based on a caching policy in response to determining that there are no unused buffers in the second memory;
evict the selected one or more sections of the indirection system map to the NAND flash memory; and
cache the section of the indirection system map to be accessed from the NAND flash memory into the one or more of the buffers of the second memory.

15. A method comprising:
partitioning a logical-to-physical (LTP) indirection map of a non-volatile memory into a plurality of segments, wherein the LTP indirection map includes a plurality of LTP entries each providing a logical address to a physical address mapping, wherein each of the segments includes a plurality of LTP entries;
storing a lookup table having a pointer for each segment of the LTP indirection map cached in a volatile memory and a physical address of each segment of the LTP indirection map in the non-volatile memory not cached in the volatile memory; and
paging the segments of the LTP indirection map to the non-volatile memory, wherein the segments of the LTP indirection map are capable of being stored in non-contiguous locations in the non-volatile memory;
determining that one of the segments of the LTP indirection map not cached in the volatile memory comprises contiguous physical addresses for all entries in the determined segment not cached in the volatile memory, and
storing in the lookup table a physical address corresponding to a first entry of a logical address of the determined one of the segments.

16. The method of claim 15, wherein partitioning the LTP indirection map of the non-volatile memory into the plurality of segments comprises partitioning the LTP indirection map of the non-volatile memory into a plurality of page-sized segments.

17. The method of claim 15, wherein the non-volatile memory is a NAND flash memory, and wherein paging of the segments of the LTP indirection map to the NAND flash memory comprises:
determining that an erase block of the NAND flash memory does not contain any user data; and
writing at least one of the segments of the LTP indirection map to the determined erase block.

18. The method of claim 15, the method further comprising:
receiving a notification of power failure of the non-volatile memory;
determining that a size of the LTP indirection map is less than an unutilized memory space in a second memory in response to receiving the notification;
building another LTP indirection map in the unutilized memory space in the second memory; and
paging the another LTP indirection map to the non-volatile memory.

19. The method of claim 15, further comprising indicating the determined one of the segments as optimized.

20. The method of claim 15, further comprising maintaining a segment table associated with the LTP indirection map, wherein the segment table is to specify where each segment of the LTP indirection map is located.

21. The method of claim 20, wherein the non-volatile memory is a NAND flash memory, further comprising:
receiving a notification of power failure of the non-volatile memory;
determining that a size of the LTP indirection map is more than an unutilized memory space in a memory in response to receiving the notification;
identifying at least one erase block of the NAND flash memory storing the segments of the LTP indirection map; and
building the segment table using the stored segments of the LTP indirection map in the identified at least one erase block.

* * * * *